(12) United States Patent
Tsai et al.

(10) Patent No.: US 8,772,979 B2
(45) Date of Patent: Jul. 8, 2014

(54) METHOD FOR POWER SELF-REGULATION IN A HIGH-POWER INDUCTION TYPE POWER SOURCE

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 549 days.

(21) Appl. No.: 13/237,668

(22) Filed: Sep. 20, 2011

(65) Prior Publication Data

US 2012/0007443 A1 Jan. 12, 2012

(30) Foreign Application Priority Data

Feb. 1, 2011 (TW) .............................. 100103836 A
Jul. 8, 2011 (TW) .............................. 100124255 A

(51) Int. Cl.
*H01F 38/00* (2006.01)
*H02J 5/00* (2006.01)

(52) U.S. Cl.
CPC .................................... *H02J 5/005* (2013.01)
USPC ........... 307/104; 307/149; 307/151; 320/108; 713/340

(58) Field of Classification Search
CPC ........... H01F 38/14; H02J 17/00; H02J 5/005; H02J 7/025
USPC ........... 307/104, 149, 151; 320/108; 713/300, 713/340

See application file for complete search history.

(56) References Cited

U.S. PATENT DOCUMENTS

| | | | | |
|---|---|---|---|---|
| 5,734,254 A * | 3/1998 | Stephens | ...................... | 320/106 |
| 7,791,311 B2 * | 9/2010 | Sagoo | ........................... | 320/108 |
| 7,953,369 B2 * | 5/2011 | Baarman | ..................... | 455/41.1 |
| 8,004,235 B2 * | 8/2011 | Baarman et al. | ............. | 320/108 |
| 8,188,619 B2 * | 5/2012 | Azancot et al. | ............. | 307/104 |
| 8,193,764 B2 * | 6/2012 | Jakubowski | ................. | 320/108 |
| 8,217,535 B2 * | 7/2012 | Uchida et al. | ................ | 307/104 |
| 8,217,621 B2 * | 7/2012 | Tsai et al. | ..................... | 320/108 |
| 8,417,359 B2 * | 4/2013 | Tsai et al. | ....................... | 700/22 |
| 8,508,077 B2 * | 8/2013 | Stevens et al. | .............. | 307/104 |
| 2008/0079392 A1 * | 4/2008 | Baarman et al. | ............. | 320/108 |
| 2009/0174263 A1 * | 7/2009 | Baarman et al. | ............. | 307/104 |
| 2010/0007307 A1 * | 1/2010 | Baarman et al. | ............. | 320/108 |
| 2013/0187476 A1 * | 7/2013 | Tsai et al. | ..................... | 307/104 |

\* cited by examiner

*Primary Examiner* — Jared Fureman
*Assistant Examiner* — Alfonso Perez Borroto
(74) *Attorney, Agent, or Firm* — Winston Hsu; Scott Margo

(57) ABSTRACT

The present inventions relates to a method for power self-regulation in a high-power induction type power source, wherein the PS module includes a PS microprocessor that is electrically connected to a PS driving unit, signal analysis circuit, coil voltage detection circuit, display unit, PS unit and earthing terminal respectively, and further connected with a resonance circuit and PS coil electrically through the PS driving unit, while the PR module contains a PR microprocessor electrically connected with a voltage detection circuit, breaker protection circuit, voltage stabilizing circuit, AM carrier modulation circuit, DC step-down transformer, rectifying filter circuit and resonance circuit respectively. While transmitting electric power, the PS module receives and analyzes data signals and then regulates the transmitted power through self-regulation programs in the microprocessor, thus achieving the purpose of power self-regulation for the PR module.

9 Claims, 8 Drawing Sheets

METHOD FOR POWER SELF-REGULATION IN A HIGH-POWER INDUCTION TYPE POWER SOURCE

This application claims the priority benefit of Taiwan patent application number 100103836 file on Feb. 1, 2011 and 100124255 file on Jul. 8, 2011.

BACKGROUND OF THE INVENTION

1. Field of the Invention

The present invention relates to a method for power self-regulation in a high-power induction type power source, particularly to a method that enables transmission of data signals by induction for power regulation, so that power supply (PS) modules and power receiving (PR) modules transfer power and data signals synchronously, and PS modules perform analysis, processing and power regulation adaptively after receiving data signals inductively.

2. Description of the Related Art

For induction type power sources (or known as wireless chargers) currently seen in the marketplace, they utilize two coils to operate: one is used as a power supply (PS) end to transmit electric power, and the other functions as a power receiving (PR) end to receive the electric power. As wireless power energy may heat metal objects and cause danger, like an electromagnetic furnace, it will also have impact on charged objects, making them liable to damage or failure due to heating.

For safety purposes, PS and PR ends of induction type power sources must recognize each other before electric power is supplied. In response to such functional requirement, it is necessary to find a method for controlling data code transmission established at PS and PR ends, and the function of data code transmission must be considerably steady to secure reliable power transfer. Among induction type charging systems of conventional use, induction type power sources can operate only when a fixed distance between the PS coil and the PR coil is kept. When the relative distance between the coils varies, the PS output cannot be changed effectively to make the PR end receive steady energy, thus making restrictions over transfer of power energy after the relative distance between coils changes. In addition, the output power of high-power induction type power sources needs to be increased or dropped in response to changes in output power requirements at the PR end, and the changing requirements of the PR end shall be regulated by the PS end through wireless induction. Since there is no real signal wire connection, it is rather difficult to take control over regulation.

Therefore, what those engaged in this field need urgently to research and improve is how to overcome the problem of safe power transmission and disadvantage of limited coil induction scope at time of inductive power transmission from electronic devices of conventional use, as well as the problem that the power at the PS end cannot change with power requirements at the PR end, causing high transmission power to produce low efficiency or low transmission power to produce insufficient power output of the PR end.

SUMMARY OF THE INVENTION

In view of aforesaid problems and disadvantage of wireless charging devices, the inventor has collected related information, conducted assessments and taken considerations in many aspects, based on his experience of many years in this field and following continuous trials and corrections, has finally invented the method for power self-regulation in a high-power induction type power source, which enables electronic devices to transmit data signals by induction for power regulation while transferring electric power inductively, so as to ensure that when the PS and PR modules transmit power and data signals synchronously, the PS module performs analysis, processing and power regulation automatically after having received data signals by induction.

The primary object of the present invention is to enable the PS and PR modules of the power source to transfer electric power and data signals by induction via the PS and PR coils, to transmit data signals stably through electrical connection of the PR module microprocessor with the AM carrier modulation circuit, breaker protection circuit, voltage regulating circuit, etc. for signal control and through sequence arrangements, to make the PS module analyze data codes from the PR module with comparators and data code analysis software embedded in the PS module microprocessor at time of synchronous transmission of power and data codes, and to regulate the power transmitted from the PS module to the PR module using power self-regulation programs in the microprocessor based on the contents of the data codes, thus achieving the purpose of power self-regulation for the PS module.

DETAILED DESCRIPTION OF THE PREFERRED EMBODIMENT

To achieve the aforesaid objects and functions as well as the techniques adopted in the present invention and its fabrication, examples of the preferred embodiment of the present invention are given below to illustrate features, functions and embodiments of the present invention in detail by referring to the accompanying drawings.

Figure 1:
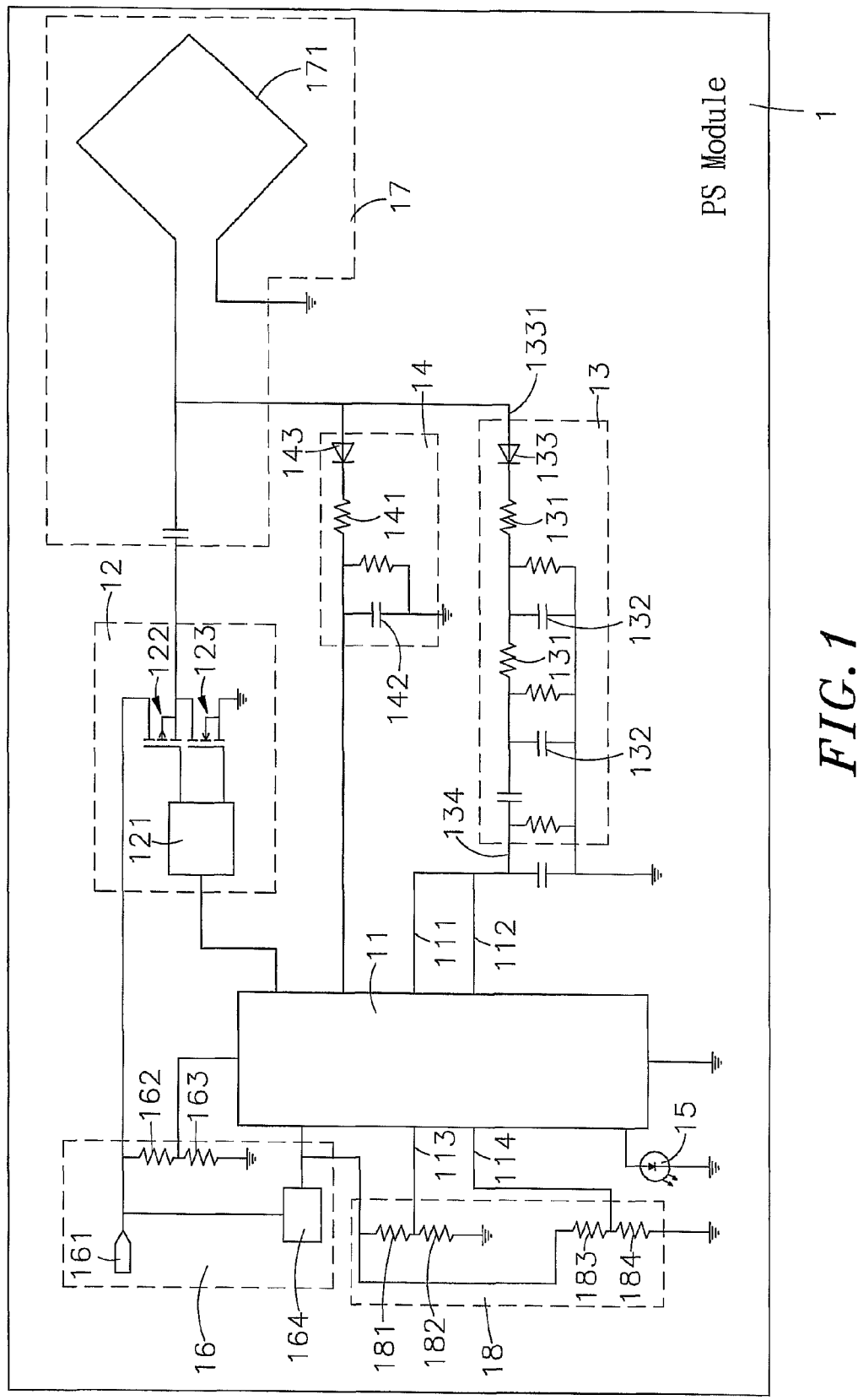
FIG. 1 shows a simple circuit diagram of the PS module according to the present invention.
Figure 2:
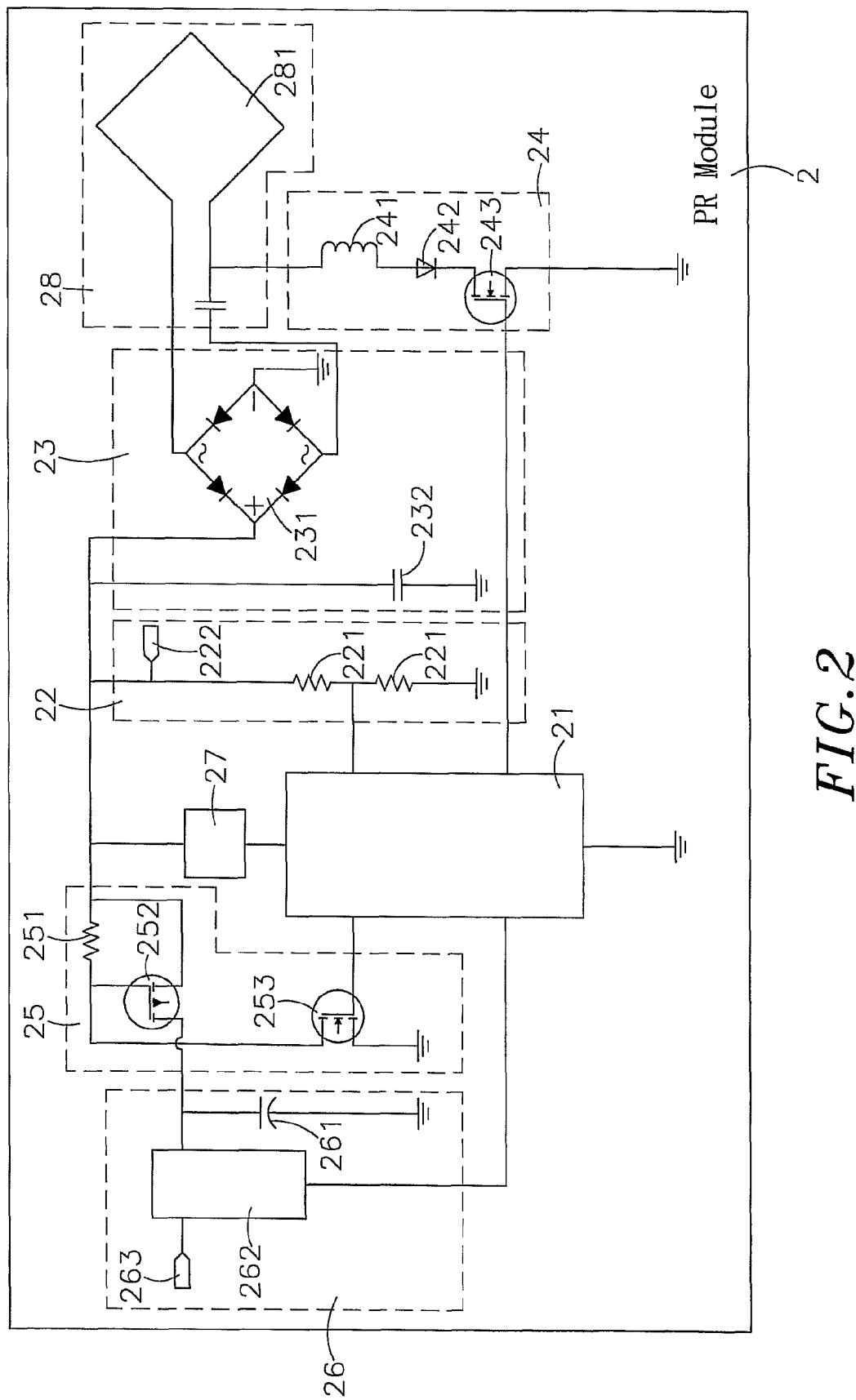
FIG. 2 shows a simple circuit diagram of the PR module according to the present invention.
Figure 3:
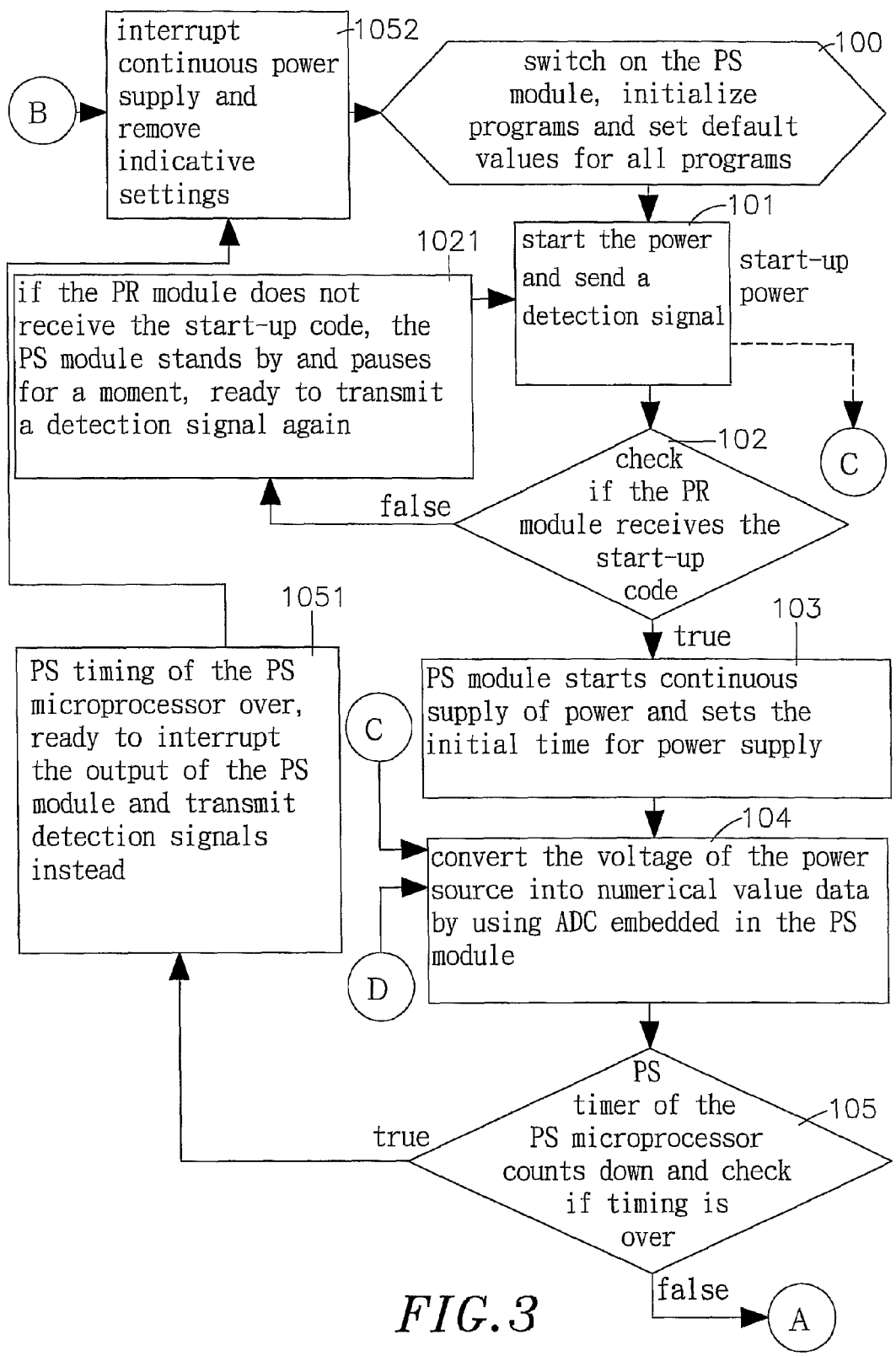
FIG. 3 shows a flow chart describing the process of power self-regulation at the PS end according to the present invention (I).
Figure 4:
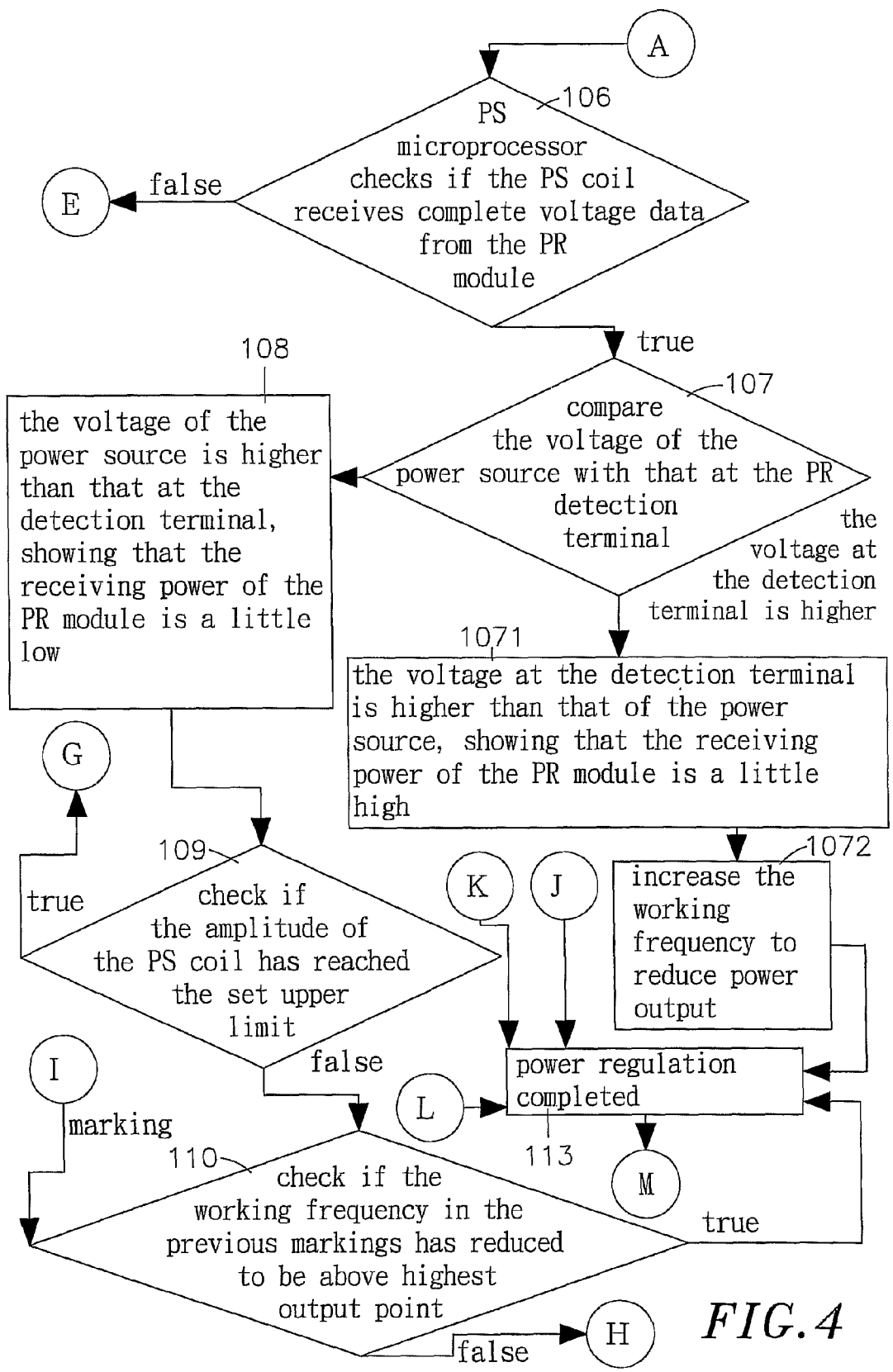
FIG. 4 shows a flow chart describing the process of power self-regulation at the PS end according to the present invention (II).
Figure 5:
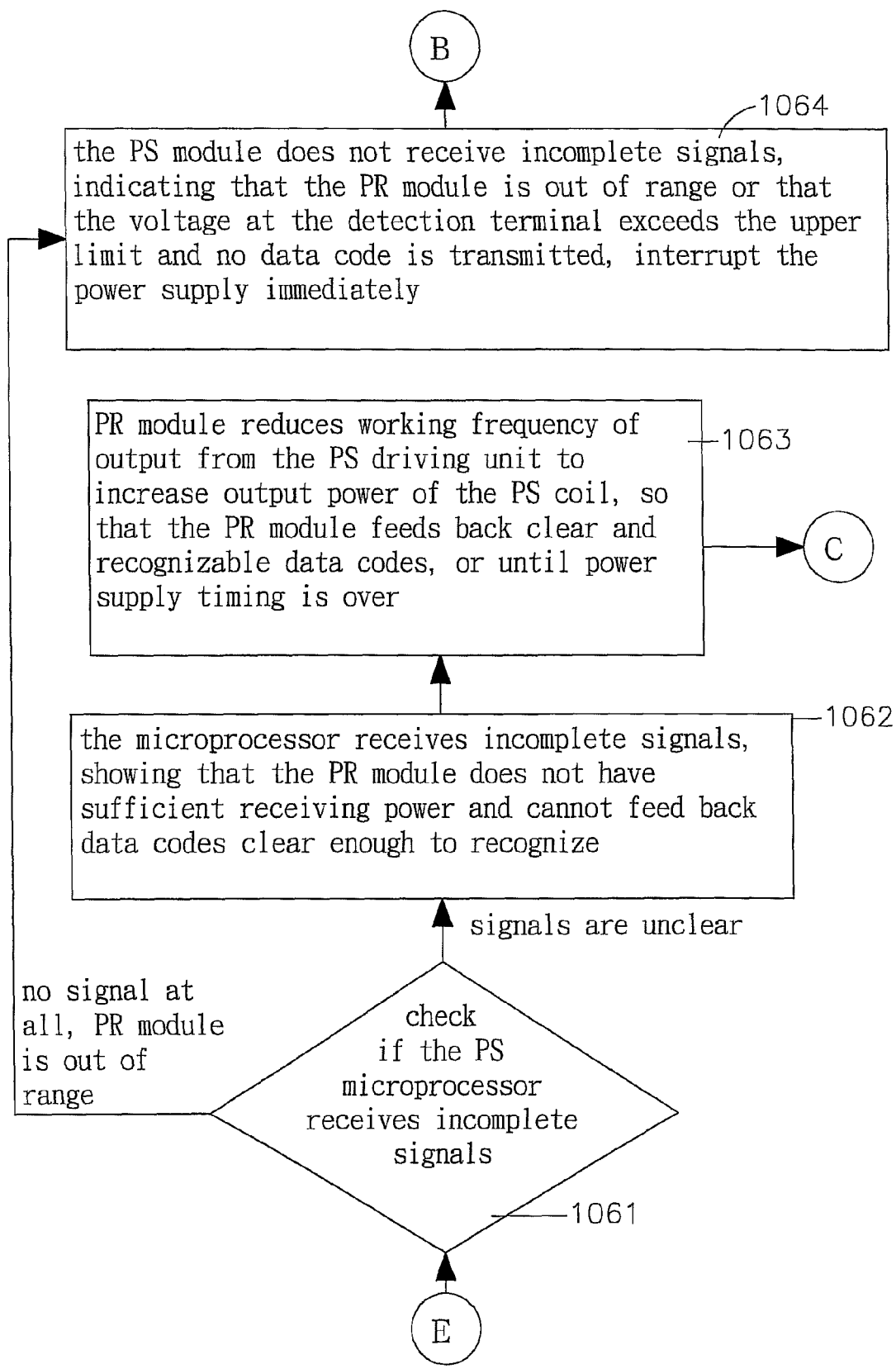
FIG. 5 shows a flow chart describing the process of power self-regulation at the PS end according to the present invention (III).
Figure 6:
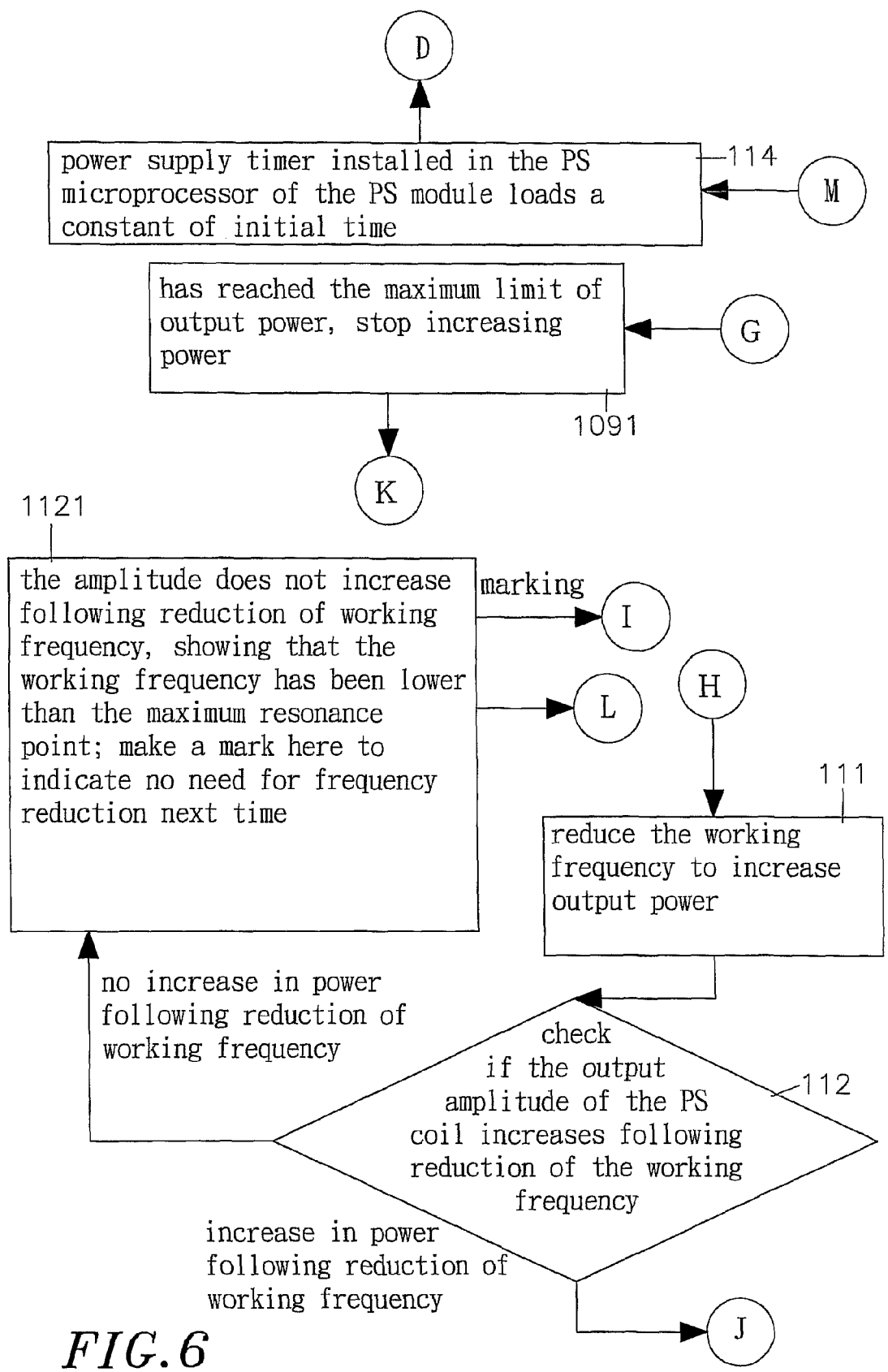
FIG. 6 shows a flow chart describing the process of power self-regulation at the PS end according to the present invention (IV).
Figure 7:
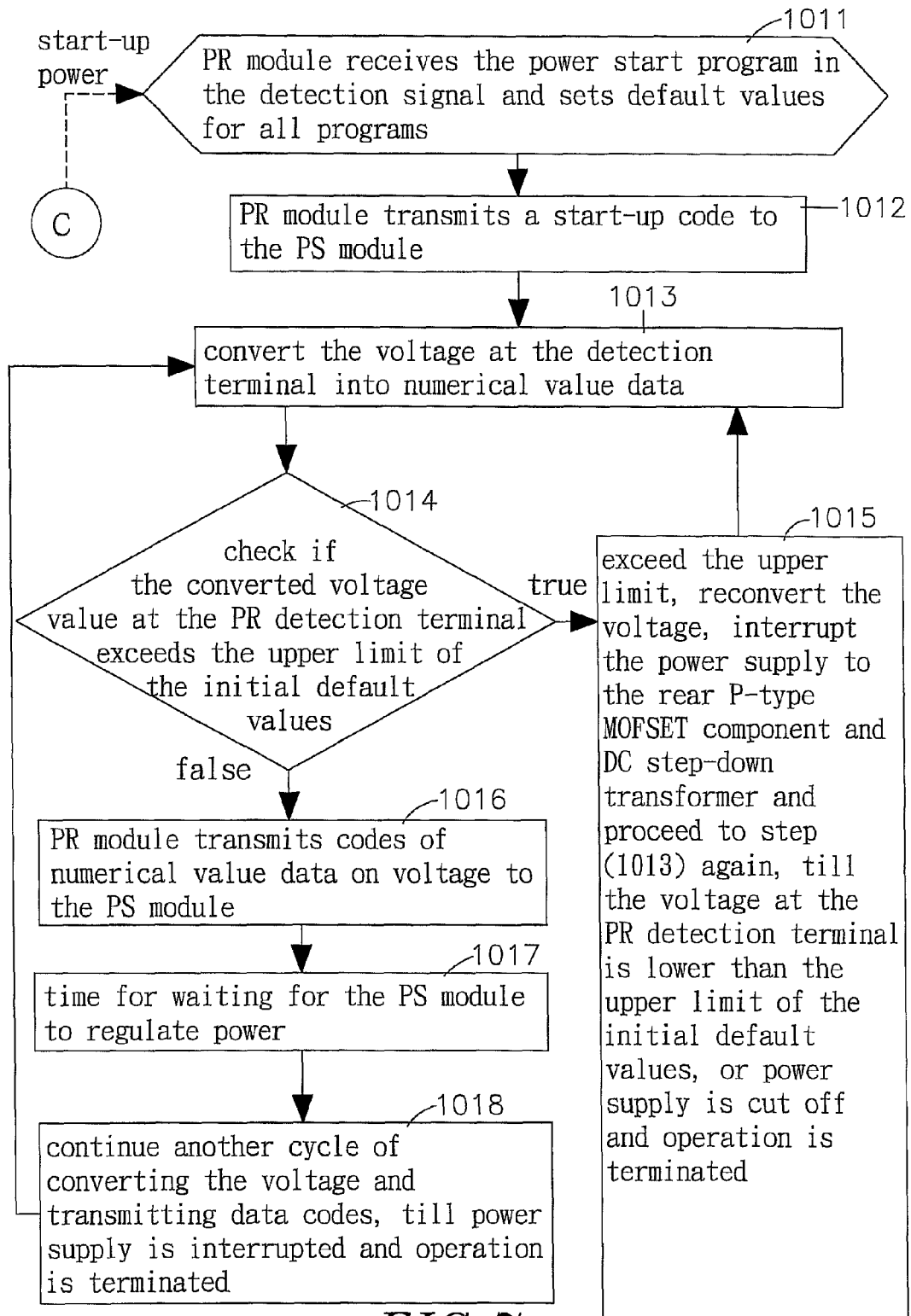
FIG. 7 shows a flow chart describing the process of power self-regulation at the PR end according to the present invention (V).

Refer to FIGS. 1 and 2, which show simple circuit diagrams of the PS and PR modules according to the present invention respectively. As shown clearly in these figures, the wireless induction device of the present invention consists of a power supply (PS) module 1 and a powered receiving (PR) module 2, wherein:

The PS module 1 includes a PS microprocessor 11, in which all related software programs, including the operating program, control program, data code analysis software, digital logic level output program, PS end power self-regulation program, are installed. Two sets of comparators are embedded in the PS microprocessor 11 and contain two positive signal input ends (+) 111 and 112 as well as two negative signal input ends (−) 113 and 114. Besides, the PS microprocessor 11 is electrically connected with a PS driving unit 12, a signal analysis circuit 13, a coil voltage detection circuit 14, a display unit 15, a power supply unit 16 and a resistor divider unit 18 respectively. The PS driving unit 12 includes a MOSFET driver 121 connected with the PS microprocessor 11, a high-side MOSFET component 122 and a low-side MOSFET component 123 respectively, so as to further connect with a resonance circuit 17 respectively via the high-side MOSFET component 122 and low-side MOSFET component 123, while the high-side MOSFET component 122 is additionally used to electrically connect with the PS unit 16; the signal analysis circuit 13 utilizes multiple series and shunt resistors 131 and capacitors 132 to connect in series with a rectifier diode 133, so as to make the rectifier diode 133 electrically connected through an input terminal 1331 to the resonance circuit 17. Then, an output terminal 134 of the signal analysis circuit 13 is used to electrically connect with the positive signal input ends 111 and 112 of the PS microprocessor 11. One negative signal input end 113 of the PS microprocessor 11 is connected electrically with series voltage level resistor dividers 181 and 182 of the resistor divider unit 18 to perform normal phase decoding, while the other negative signal input end 114 of the PS microprocessor 11 is connected electrically with antiphase decoding voltage level resistor dividers 183 and 184, and the resistor divider unit 18 is used to electrically connect with the PS microprocessor 11 and a DC step-down transformer 164 of the PS unit 16; the coil voltage detection circuit 14 contains series and shunt resistors 141 and capacitors 142, which are connected in series with a rectifier diode 143 used to electrically connect with the resonance circuit 17; the PS unit 16 is connected respectively with a power supply source 161, two detection resistor dividers 162 and 163 placed in series and the DC step-down transformer 164, and is electrically linked with the PS driving unit 12; the resonance circuit 17 is connected with a PS coil 171 that can transmit electric energy and data signals.

The PR module 2 is equipped with a PR microprocessor 21 where the operating program, control program, PR power self-regulation program and other related software programs are installed. The PR microprocessor 21 is electrically connected with a voltage detection circuit 22, a rectifying filter circuit 23, an AM carrier modulation circuit 24, a breaker protection circuit 25, a voltage stabilizing circuit 26 and a DC step-down transformer 27 respectively. Multiple series resistors 221 are installed in the voltage detection circuit 22 to link with the PR microprocessor 21 electrically and are connected in series with a detection terminal 222, the rectifying filter circuit 23, breaker protection circuit 25 and DC step-down transformer 27 respectively; and the rectifying filter circuit 23 contains a rectifier 231 and a capacitor 232 connected in parallel with the voltage detection circuit 22, breaker protection circuit 25 and DC step-down transformer 27 respectively, wherein the rectifier 231 is connected in parallel with a resonance circuit 28 and a PR coil 281, both of which are connected in series with the AM carrier modulation circuit 24 that includes an inductor 241, a rectifying diode 242 and a MOFSET component 243 installed in series. The breaker protection circuit 25 is connected in series with a resistor 251, a P-type MOFSET component 252 and an N-type MOFSET component 253, wherein the N-type MOFSET component 253 is connected to the PR microprocessor 21 electrically. In addition, the P-type MOFSET component 252 is used to electrically connect with a buffer capacitor 261 and a DC step-down transformer 262 in the voltage-stabilizing circuit 26, wherein the DC step-down transformer 262 is installed to link a PR output terminal 263 electrically. Then, the voltage detection circuit 22, breaker protection circuit 25, voltage-stabilizing circuit 26 and DC step-down transformer 27 are electrically connected with the PR microprocessor 21 respectively, while the voltage detection circuit 22, breaker protection circuit 25 and DC step-down transformer 27 are electrically connected with the rectifying filter circuit 23. Finally, the rectifying filter circuit 23 and the AM carrier modulation circuit 24 are connected electrically with the resonance circuit 28 so as to connect with the PR coil 281 electrically.

The PR microprocessor 21 of the PR module 2 is electrically connected with the AM carrier modulation circuit 24 and breaker protection circuit 25 to control data signals. It is electrically connected with the voltage-stabilizing circuit 26 to control data signals and make the data signals modulated by the AM carrier modulation circuit 24 electrically connected with the PR microprocessor 21 through time sequence arrangements. Following modulation operations, these data signals are fed back by the PR coil 281 to the PS coil 171 of the PS module 1 to conduct steady transmission of the data signals. After having received data signals from the PR coil 281, the PS coil 171 sends the data signals to the coil voltage detection circuit 14 for detection and transmits these signals to the signal analysis circuit 13 for analysis. Then, these data signals are transferred to the two comparators embedded in the PS microprocessor 11 of the PS module 1 and received by the two positive signal input ends 111 and 112. In the meantime, the PS microprocessor 11 relies on the two negative signal input ends 113 and 114 to receive reference voltage levels from the normal phase decoding voltage level resistor dividers 181 and 182 as well as antiphase decoding voltage level resistor dividers 183 and 184 of the resistor divider unit 18, so that the two comparators can compare voltage values of the data signals with those of the reference voltage levels to produce output signals of digital logic levels, and the output signals are processed by the data decoding program embedded in the PS microprocessor 11.

In the process of power transmission from the induction type power source, the power requirements of the PR module 2 may change (increase or reduce), and the relative distance or position between the PS coil 171 and PR coil 281 may change, too. All these changes will have impact on the power received by the PR module 2. To ensure that the power received by the PR module 2 stable is kept stable, the PS module 1 can automatically adapt to the power that the PR module 2 receives, and power self-regulation programs are used for mutual control to secure stable transfers of electric power and data codes.

Refer to FIGS. 1, 2, 3, 4, 5, 6 and 7, which respectively show simple circuit diagrams of the PS and PR modules, flow charts describing the process of power self-regulation at the PS end (Part I, II, III and IV) and a flow chart describing the process of power self-regulation at the PR end (V) according to the present invention. As shown clearly in these figures, in order to realize power self-regulation through transmission of data codes between the PS module 1 and PR module 2 and inductive receipt of data signals by the PS module 1, the method for power self-regulation of the present invention comprises the following steps:

(100) initialize programs in the PS module 1 and set default values for all programs after the PS module 1 is switched on.

(101) PS module 1 sends a detection signal to start the PR module 2 within the inductive range.

(1011) PR module 2 receives the power start-up program in the detection signal and sets default values for all programs.
(1012) PR module 2 transmits a start-up code to the PS module 1.
(1013) convert the voltage at the PR detection terminal 222 into numerical value data on voltage (the 8-bit record format is adopted in the preferred embodiment of the present invention, and other record formats may be adopted).
(1014) check if the converted voltage value at the PR detection terminal 222 exceeds the upper limit of the initial default values. If yes, proceed to step (1015); otherwise, proceed to step (1016).
(1015) exceed the preset upper limit, reconvert the voltage, interrupt the power supply to the rear P-type MOFSET component 252 and DC step-down transformer 262 and proceed to step (1013) again, till the voltage value at the PR detection terminal 222 is smaller than the upper limit of the initial default values, or power supply is interrupted and operation is terminated.
(1016) PR module 2 transmits codes of numerical value data on voltage to the PS module 1.
(1017) time for waiting for the PS module 1 to regulate power.
(1018) continue another cycle of proceeding to step (1013), converting the voltage and transmitting data codes, till power supply is interrupted and operation is terminated.
(102) check if the PS module 1 receives the start-up code from the PR module 2 in step (1011); if yes, proceed to step (1021); otherwise, proceed to step (103).
(1021) PR module 2 does not receive the start-up code, the PS module 1 stands by and pauses for a moment (200 ms in this case, and other values may be selected), ready to transmit a detection signal, and proceed step (101) again.
(103) PS module 1 starts continuous supply of power, sets the initial time for the power supply timer and begins to time.
(104) convert the voltage into numerical value data by using ADC embedded in the PS module 1 (the 8-bit record format is adopted in the preferred embodiment of the present invention, and other record formats may also be applicable).
(105) PS timer of the PS microprocessor 11 counts down to check if timing is over; if yes, proceed to step (1051); otherwise, proceed to step (106).
(1051) PS timing of the PS microprocessor 11 over, ready to interrupt the output of the PS module 1; transmit detection signals instead and continue to implement step (1052),
(1052) interrupt continuous power supply, remove indicative settings and implement step (100).
(106) PS microprocessor 11 checks if the PS coil 171 receives complete voltage data from the PR module 2; if yes, proceed to step (107); otherwise, proceed to step (1061).
(1061) check if the PS microprocessor 11 receives incomplete signals; if the signals are not clear, it indicates that the PR module 2 is still within the induction range, then proceed to step (1062); if there is no signal, it indicates that the PR module 2 is out of range, proceed to step (1064).
(1062) the PS microprocessor 11 receives incomplete signals, showing that the PR module 2 does not have sufficient receiving power and cannot feed back data codes clear enough to recognize.
(1063) PR module 1 reduces working frequency of output from the PS driving unit 12 to make output power of the PS coil 171 increase, so that the PR module 2 feeds back clear and recognizable data codes, or until power supply timing is over.
(1064) the PS module does not receive incomplete signals, indicating that the PR module 2 is out of range, or that the voltage at the PR detection terminal 222 exceeds the upper limit and no data code is transmitted, interrupt the power supply immediately and proceed to step (1052).
(107) compare the voltage of the power source 161 with that at the PR detection terminal 222 (in the preferred embodiment of the present invention, the two voltage values are recorded in the same 8-bit format, and may be recorded in other equivalent bit format); if the voltage at the PR detection terminal 222 is higher, proceed to step (1071); if the voltage of the power source 161 is higher, proceed to step (108).
(1071) the voltage at the PR detection terminal 222 of the PR module 2 is higher than that of the power source 161 of the PS module 1, showing that the receiving power of the PR module 2 is a little high.
(1072) PS module 1 increases the working frequency of output from the PS driving unit 12 to make the output power of the PS coil 171 decrease, and then proceed to step (113).
(108) the voltage of the power source 161 of the PS module 1 is higher than that at the PR detection terminal 222 of the PR module 2, showing that the receiving power of the PR module 2 is a little low.
(109) check if the amplitude of the PS coil 171 has reached the upper limit set at time of program initialization; if not, proceed to step (110); if yes, proceed to step (1091).
(1091) has reached the maximum limit of output power. Stop increasing power and proceed to step (113).
(110) check if the working frequency in the previous markings has become lower than the maximum resonance point (set in step (1121)); if yes, proceed to step (113); otherwise, proceed to step (111).
(111) PS module 1 reduces the working frequency of output from the PS driving unit 12 so as to increase the output power of the PS coil 171, and proceed to step (112).
(112) check if the output amplitude of the PS coil 171 increases following reduction of the working frequency; if yes, proceed to step (113); otherwise, proceed to step (1121).
(1121) the amplitude does not increase following reduction of working frequency, showing that the working frequency has been lower than the maximum resonance point (refer to FIG. 8); make a mark here to indicate no need for frequency reduction next time and proceed to step (113).
(113) continue proceeding to step (114) following power regulation.
(114) power supply timer installed in the PS microprocessor 11 of the PS module 1 loads a constant of initial time and proceed to step (104) following power regulation.

The steps for power self-regulation as indicated above mainly include detecting the status of voltage of the PR detection terminal 222 of the PR module 2, converting it into signals of numerical value data on voltage, transmitting the signals to the PS module 1 and comparing the voltage value of the power source 161 of the PS module 1 with that of the PR detection terminal 222 to achieve self-regulation of working frequency and output power, so that the PR module 2 can receive power supply steadily.

In the high-power induction type power source, power self-regulation refers to that the PS module 1 can adjust the output power according to changes in requirements for output power from the PS module 2. Because there is no physical circuit connecting the PS module 1 with the PR module 2 and electric power is transmitted through an inductive coil, it is necessary to establish a mechanism for control of data transmission between the PS module 1 and the PS module 2. In addition, after the PS module 1 receives data signals from the PR module 2 by induction, the PS microprocessor 11 of the PS module 1 will give a priority to analysis and processing of data signals, no matter which step is implemented in the charging process. After processing of data signals is over, the PS microprocessor 11 will return to the original step in the charging process, so that the charging operation will not be affected as the PS module 1 and PR module 2 performs synchronous operations of electric power and data transmission.

Figure 8:
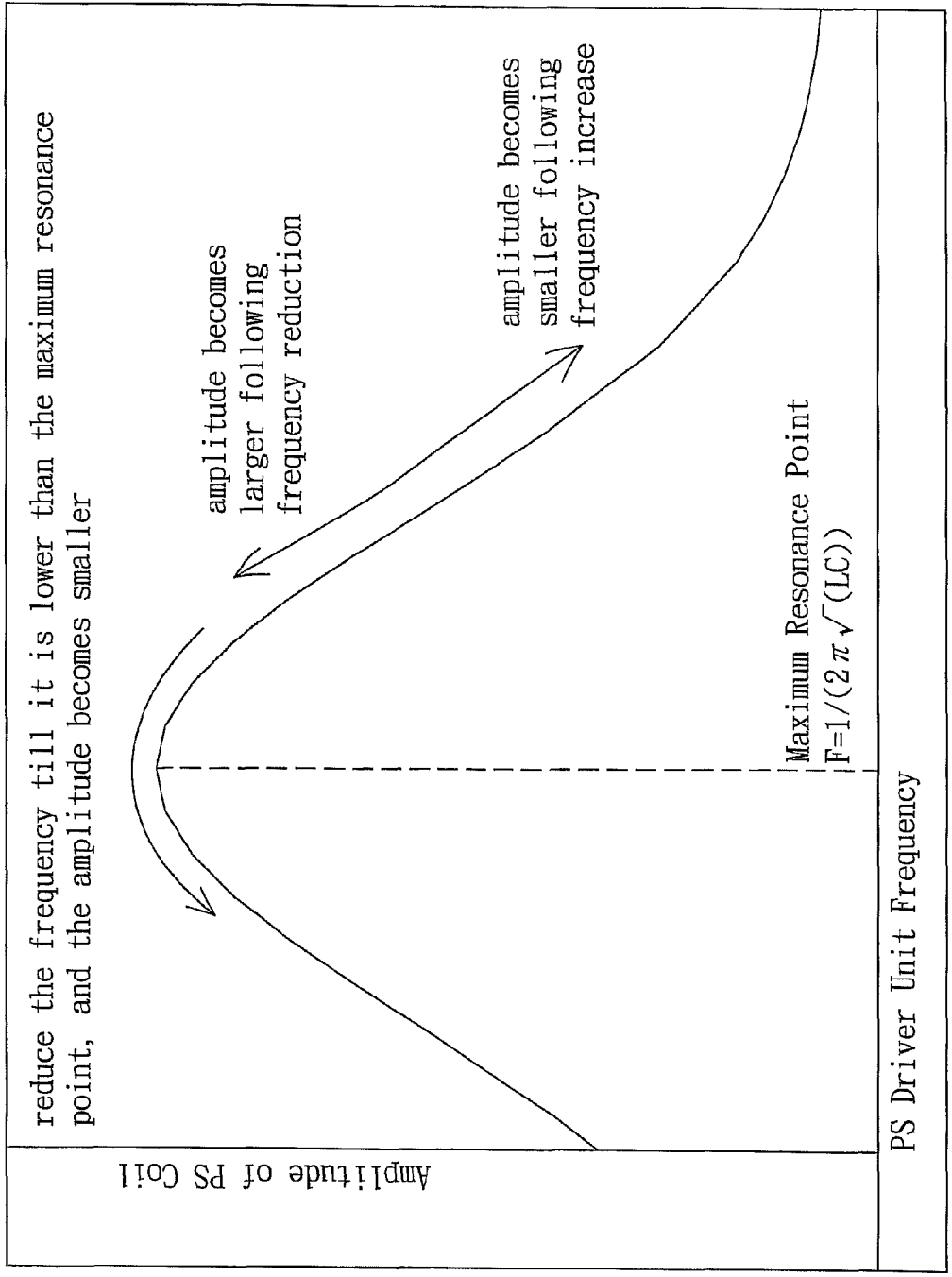
FIG. 8 is a schematic diagram illustrating frequencies of power self-regulation according to the present invention.

Refer to FIGS. 1, 2 and 8, which respectively show simple circuit diagrams of PS and PR modules and a schematic drawing illustrating frequencies of power self-regulation according to the present invention. As shown clearly in these figures, the power received by the PR module 2 changes with the relative distance between the PS coil 171 and the PR coil 281 in the process of inductive transmission of electric power from the PS module 1 and the PR module 2. When such relative distance becomes longer, the power received by the PR module 2 will become lower; otherwise, the power received by the PR module 2 will become higher when the relative distance becomes shorter. To secure steady receipt of power by the PR module 2, it is essential to adjust the output power of the PS module 1 continuously. If the relative distance becomes longer, causing the power received by the PR module 2 to become lower, the PS module 1 will increase the output power to make the power received by the PR module 2 restore stability; otherwise, the PS module 1 will reduce the output power in response to shorter relative distance.

In practice, terminal voltages of the PS module 1 and PR module 2 are utilized respectively as the measuring points of power, and in the programmed process, the voltage at the detection terminal of the power supply source 16 of the PS module 1 is compared with that at the PR detection terminal 222 of the PR module 2 to fulfill functions of comparison and regulation. Another purpose of such design is to utilize the mechanism for comparison of voltage between the PS module 1 and the PR module 2. When the source voltage of the PS module 1 increases, the steady value set for received power of the PR module 2 will also increase. Such method will be effective in stabilizing the status of data code transmission of the PS module 1. Among working properties of the induction type power source, higher transmission efficiency and steady data code transmission can be achieved under the circumstance that the voltage of the power source 16 of the PS module 1 is close to the voltage induced by the PR module 2, while the voltage at the PR output terminal can still be kept steady as it is processed by the DC step-down transformer.

In the process of power self-regulation, signals of voltage data are transmitted through the PR module 2 to the PS module 1 for analysis and comparison to adjust power output, but changes in the relative distance between the PS coil 171 and the PR coil 281 may make it unable to feed data codes clear enough for recognition, or sudden increases in power at the PR output terminal may cause unclear data codes unable to be analyzed. Yet such cases occur only under the conditions that the PS coil 171 and PR coil 281 are still within the inductive range, and the power self-regulation program includes an operational mechanism to respond to such cases. When the PS module 1 receives unclear data codes, it will consider that the inductive coil is still within the range and increase its output energy to make the PR module 2 able to receive more power and stabilize the output of the PR module 2 under the conditions of longer relative distance or more power needs. If no data code is received, the PS module 1 will consider the PR module 2 out of range and terminate the output from the PS module 1 immediately.

The protection mechanism for the PR module 2 operates in the following way: if the voltage at the PR detection terminal 222 is too high, terminate transmission of data codes and interrupt output from the PR module 2 to protect back-end equipments from being damaged by high voltage; when transmission of data codes from the PR module 2 is terminated, the PS module 1 will consider the device out of range and immediately interrupt power supply to ensure that component of the PR module 2 are protected from damages due to increased power output from the PS module 1 under the circumstances that unclear data codes are transmitted.

The protection mechanism for the PS module 1 is arranged in the following way: to limit the maximum power output through detecting the amplitude of the PS coil 171 to prevent damages to components and regulation of output power is made by changing the amplitude output on the PS module 171 through changes in the frequency of the PS driving unit 12; define the maximum amplitude limit in the stage of program initialization. In the process of reducing the frequency to increase the amplitude, if the amplitude is detected to have reached the upper limit, stop reducing the frequency immediately, and the upper limit will be preset according to the circuit needs. But under the condition of inductive high-power supply, the amplitude of the PS coil 171 may be reduced due to its inductive coupling with the PR coil 281. Therefore, it is possible in some cases that the frequency reduces to the maximum resonance point but the amplitude does not reach the upper limit and the frequency does not reduce, thus leading to the mistakes that smaller amplitude results in smaller power following frequency reduction beyond the maximum resonance point. So there is another protection mechanism created to check changes in the coil amplitude once again following frequency reduction. This mechanism will instruct to stop frequency reduction if detecting that the amplitude reduces following frequency reduction, thus enabling the PS module 1 to successfully regulate power automatically and protect the circuit from being damaged as a result of too high power under different conditions of inductive coupling.

The above descriptions are given only to illustrate one preferred embodiment of the present invention and shall not be construed as limiting the appended patent claims of the present invention. As disclosed in the present invention, the method for power self-regulation in a high-power induction type power source achieves its objects and functions through use of the power self-regulation programs embedded in the PS and PR microprocessors of the PS and PR modules to allow the PR module to automatically regulate power output from the PS module under the circumstances of inducing changes in distance and power requirements, so that the high-power induction type power source can transmit power to the PR module steadily. In addition, the PS and PR modules are equipped with complete protection mechanisms to prevent circuits from being damaged by too high power. It is hereby stated that all modifications and equivalent structural changes made without departing from the spirit and art of the present invention shall be included in the appended patent claims of the present invention.

When applied and fabricated practically, the method for power self-regulation in a high-power induction type power source of the present invention can provide the advantages as follows:

1. the PS module 1 can regulate its output power in response to changing requirements of output power from the PR module 2, and complete protection mechanisms are established to protect circuits.

2. regulate power output automatically to secure steady power output from the PR module 2 when the relative induction distance changes between the PS module 1 and the PR module 2.
3. judge the inductive status automatically and further regulate power output automatically under the condition of different coil coupling induction.

Therefore, the present invention mainly deals with design of high-power inductive PS and PR modules. It makes use of the PS module to receive data signals inductively and then carries out operations of automatic signal analysis, processing and power self-regulation, so as to achieve power self-regulation when the PS and PR modules transmit power energy. Besides, the PS module can automatically analyze and process data signals and regulate its power output after receiving the data signals from the PR module inductively, thus making it have functions of transmitting electric power and data signals steadily and synchronously. However, the aforesaid descriptions are given only to illustrate one preferred embodiment of the present invention and shall not be construed as limiting the appended patent claims of the present. It is hereby stated that all modifications and equivalent structural changes made without departing from the spirit and art of the present invention shall be included in the appended patent claims of the present invention.

In summary, the method for power self-regulation in a high-power induction type power source as disclosed in the present invention can achieve its functions and objects when applied practically. Therefore, the present invention is really an excellent one with practical applicability and can satisfy the terms and conditions for patentability of a utility model. While the application of patent is filed pursuant to applicable laws, your early approval will be highly appreciated so as to guarantee benefits and rights of the inventor who has worked hard at this invention. For any question, please do not hesitate to inform the inventor by mail, and the inventor will try his best to cooperate with you.

What the invention claimed is:

1. A method for power self-regulation in a high-power induction type power source, comprising the following steps:
   (a) switching on the power supply (PS) module and power receiving (PR) module, and initializing programs in the PS module;
   (b) delivering a detection signal and start-up power from the PS module to the PR module within the inductive range;
   (b1) PR module receiving the power start-up program in the detection signal and setting values as necessary;
   (b2) transmitting a start-up code from the PR module to the PS module;
   (b3) converting the voltage at the detection terminal into numerical value data;
   (b4) checking if the converted voltage value at the PR detection terminal exceeds the upper limit of the initial default values, if yes, proceed to step (b5); otherwise, proceed to step (b6);
   (b5) exceeding the upper limit, reconverting the voltage value, interrupting the power supply to the rear P-type MOFSET component and DC step-down transformer, and proceeding to step (b3) again, till the voltage value at the PR detection terminal is smaller than a preset lower limit, or power supply is interrupted and operation is terminated;
   (b6) transmitting codes of numerical value data on voltage from the PR module to the PS module;
   (b7) waiting for the PS module to regulate power;
   (b8) continuing another cycle of converting the voltage and transmitting data codes, till power supply is interrupted and operation is terminated, and proceed to step (b3);
   (c) checking if the PS module receives the start-up code; if yes, proceed to step (d); otherwise, proceed to step (c1);
   (c1) PR module not receiving the start-up code, PS module standing by to transmit a detection signal, and proceeding to step (b) again;
   (d) starting continuous power supply from the PS module and setting the initial time for the power supply;
   (e) converting the voltage of the power source into numerical value data;
   (f) PS timer of the PS microprocessor counting down to check if timing is over; if yes, proceeding to step (f1); otherwise, proceeding to step (g);
   (f1) PS microprocessor timing over, stopping continuous power supply and cutting off the output power to transmit detection signals instead; proceeding to step (f2);
   (f2) shutting down continuous power supply, removing indicative settings and proceeding to step (a);
   (g) checking if complete data are received from the PR module; if yes, proceeding to step (h); otherwise, proceeding to step (g1);
   (g1) checking if incomplete signals are received; proceeding to step (g2) in case of unclear signals; proceeding to step (g4) if there is no any signal;
   (g2) PR module not having sufficient receiving power and unable to feed back data codes clear enough to recognize if incomplete signals are received;
   (g3) PS module reducing its working frequency and increasing its output power to make the PR module feed back correct data codes, or until power supply timing is over;
   (g4) PS module not receiving incomplete signals, no data code transmitted, interrupting the power supply and proceed to step (f2);
   (h) comparing the voltage of the power source with that at the detection terminal of the PR module; proceeding to step (h1) if the voltage at the detection terminal is larger; proceeding to step (i) if the voltage of the power source is larger;
   (h1) the receiving power of the PR module is a little high if the voltage at the detection terminal is larger than that of the power source;
   (h2) increasing the working frequency to make the output power decrease;
   (i) the receiving power of the PR module is a little low if the voltage of the power source is larger than that at the detection terminal;
   (j) checking if the amplitude of the PS coil has reached the preset upper limit; if not, proceeding to step (k); if yes, proceeding to step (j1);
   (j1) has reached the maximum limit of output power, stopping power increases and proceeding to step (n);
   (k) checking if the working frequency in the previous markings has become lower than the maximum resonance point; if yes, proceeding to step (n); otherwise, proceeding to step (l);
   (l) reducing the working frequency and increasing the output power;
   (m) checking if the output amplitude of the PS coil increases following reduction of the working frequency; if yes, proceeding to step (n); otherwise, proceeding to step (m1);
   (m1) if the amplitude does not increase following reduction of working frequency, it shows that the working frequency has been lower than the maximum resonance point; make a mark here to indicate there is no need for frequency reduction next time;

(n) power regulation completed;

(o) timer of the PS module microprocessor filling in an initial constant of time and proceeding to step (e) following power regulation.

2. The method for power self-regulation in a high-power induction type power source according to claim 1, wherein the high-power induction type power source consists of a power supply (PS) module and a power receiving (PR) module; the PS module includes a PS microprocessor in which a comparator is installed, and the PS microprocessor is electrically connected with a PS driving unit that drives the PS module to operate, a signal analysis circuit to detect and analyze coil data signals, a coil voltage detection circuit to detect the voltage of the PS coil, a display unit to display the operational status of the PS module, a PS unit to supply electricity, a resistor divider and an earthing terminal respectively; the PS driving unit is electrically connected with a resonance circuit, which, together with the coil voltage detection circuit and signal analysis circuit, is respectively connected to a PS coil capable of transmitting electric power and data signals electrically, while a PR coil of the PR module that corresponds to the PS coil is installed for transmission of inductive signals; the PR module is equipped with a PR microprocessor, which is electrically connected with a voltage detection circuit to detect the voltage of the power source, a breaker protection circuit used for switch control during operation, a voltage stabilizing circuit to stabilize the voltage of the power source, an AM carrier modulation circuit to encode data signals and a DC step-down transformer to stabilize the voltage of the power source respectively, and further connected to a rectifying filter circuit capable of filtering and rectifying power signals electrically via the breaker protection circuit, DC step-down transformer and voltage detection circuit, while the rectifying filter circuit and AM carrier modulation circuit are further connected with the resonance circuit and the PR coil respectively.

3. The method for power self-regulation in a high-power induction type power source according to claim 2, wherein the PS microprocessor contains two sets of comparators, and both comparators include a positive signal input end used for input of data signals and a negative signal input end used for input of reference voltage levels.

4. The method for power self-regulation in a high-power induction type power source according to claim 2, wherein the PS driving unit of the PS module consists of a MOFSET driver, a high-side MOFSET component and a low-side MOFSET component used to adjust the working frequency of the MOFSET driver for changing the switching status of MOFSET, in which the high-side and low-side MOFSET components are electrically connected with the resonance circuit and PS coil respectively.

5. The method for power self-regulation in a high-power induction type power source according to claim 2, wherein the PS unit of the PS module connects to a power source that receives external power supply and two series detection resistor dividers.

6. The method for power self-regulation in a high-power induction type power source according to claim 2, wherein the display unit of the PS module may be a LCD, LED or CLP display.

7. The method for power self-regulation in a high-power induction type power source according to claim 2, wherein the voltage detection circuit of the PR module consists of detection terminals connected electrically in series and two detection resistor dividers, while the rectifying filter circuit of the PR module includes a rectifier and capacitors.

8. The method for power self-regulation in a high-power induction type power source according to claim 2, wherein the AM carrier modulation circuit of the PR module consists of inductors, diodes and MOFSET components in series; the breaker protection circuit of the PR module comprises resistors, P-type MOFSET components and N-type MOFSET components.

9. The method for power self-regulation in a high-power induction type power source according to claim 2, wherein the voltage stabilizing circuit of the PR module comprises capacitors and DC step-down transformer, and the DC step-down transformer is electrically connected with a PR end.

* * * * *